(12) United States Patent
Agarwala

(10) Patent No.: US 7,839,422 B2
(45) Date of Patent: Nov. 23, 2010

(54) GRADIENT-DOMAIN COMPOSITING

(75) Inventor: Aseem Agarwala, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 853 days.

(21) Appl. No.: 11/638,895

(22) Filed: Dec. 13, 2006

(65) Prior Publication Data

US 2008/0143744 A1 Jun. 19, 2008

(51) Int. Cl.
*G09G 5/377* (2006.01)
(52) U.S. Cl. .................................. 345/629; 345/619
(58) Field of Classification Search ................. 345/629, 345/619
See application file for complete search history.

(56) References Cited

U.S. PATENT DOCUMENTS

| | | | | |
|---|---|---|---|---|
| 3,375,753 A * | 4/1968 | Ramsell | .................. | 353/99 |
| 5,613,048 A * | 3/1997 | Chen et al. | .................. | 345/419 |
| 5,666,475 A * | 9/1997 | Salesin et al. | .................. | 345/428 |
| 5,912,672 A * | 6/1999 | Liguori | .................. | 345/619 |
| 6,011,558 A | 1/2000 | Hsieh et al. | | |
| 6,233,279 B1 * | 5/2001 | Boon | .................. | 375/240.08 |
| 6,236,757 B1 * | 5/2001 | Zeng et al. | .................. | 382/240 |
| 6,307,975 B1 * | 10/2001 | Hosaka et al. | .................. | 382/243 |
| 6,393,162 B1 * | 5/2002 | Higurashi | .................. | 382/284 |
| 6,553,148 B2 * | 4/2003 | Zeng et al. | .................. | 382/240 |
| 6,760,075 B2 * | 7/2004 | Mayer et al. | .................. | 348/383 |
| 6,795,589 B1 * | 9/2004 | Tlaskal et al. | .................. | 382/284 |
| 6,816,619 B2 * | 11/2004 | Tlaskal et al. | .................. | 382/240 |
| 6,912,293 B1 * | 6/2005 | Korobkin | .................. | 382/100 |
| 6,985,161 B1 * | 1/2006 | Politis | .................. | 345/629 |
| 7,260,258 B2 * | 8/2007 | Foote et al. | .................. | 382/167 |
| 7,292,255 B2 * | 11/2007 | Doan et al. | .................. | 345/629 |
| 2001/0022858 A1 * | 9/2001 | Komiya et al. | .................. | 382/274 |
| 2002/0003906 A1 * | 1/2002 | Zeng et al. | .................. | 382/240 |
| 2002/0027563 A1 * | 3/2002 | Van Doan et al. | .................. | 345/630 |
| 2002/0180727 A1 * | 12/2002 | Guckenberger et al. | ..... | 345/418 |
| 2003/0156262 A1 * | 8/2003 | Baker et al. | .................. | 353/31 |
| 2004/0041919 A1 * | 3/2004 | Yamanaka | .................. | 348/222.1 |
| 2004/0078300 A1 * | 4/2004 | Smith et al. | .................. | 705/27 |
| 2004/0169663 A1 * | 9/2004 | Bernier | .................. | 345/629 |

(Continued)

FOREIGN PATENT DOCUMENTS

EP 1377026 2/2004

OTHER PUBLICATIONS

Multi-perspective images for visualisation Scott Vallance, Paul Calder May 2001 VIP '01: Proceedings of the Pan-Sydney area workshop on Visual information processing—vol. 11 , vol. 11 Publisher: Australian Computer Society, Inc.*

(Continued)

*Primary Examiner*—Javid A Amini
(74) *Attorney, Agent, or Firm*—Fish & Richardson P.C.

(57) ABSTRACT

Systems, methods, and apparatus, including computer program products, for forming composite images using gradient-domain compositing are provided. In some implementations, a method is provided. The method includes receiving two or more source images and aligning the received source images to form an assembled composite image. The method also includes stitching the seams between the aligned source images in the assembled composite image to form a final composite image. The stitching includes performing a gradient domain compositing. The gradient domain compositing uses a subset of pixels in the assembled composite image including calculating individual pixel values along the seams and interpolating pixel values away from the seams.

24 Claims, 8 Drawing Sheets

U.S. PATENT DOCUMENTS

| | | | |
|---|---|---|---|
| 2004/0252884 A1* | 12/2004 | Foote et al. | 382/162 |
| 2006/0072176 A1* | 4/2006 | Silverstein et al. | 358/540 |
| 2006/0256397 A1* | 11/2006 | Cui | 358/450 |
| 2007/0046448 A1* | 3/2007 | Smitherman | 340/431 |
| 2008/0259223 A1* | 10/2008 | Read et al. | 348/745 |
| 2009/0074275 A1* | 3/2009 | O Ruanaidh | 382/128 |

OTHER PUBLICATIONS

Interactive Design of Multi-Perspective Images for Visualizing Urban Landscapes Augusto Roman, Gaurav Garg, Marc Levoy Oct. 2004 VIS '04: Proceedings of the conference on Visualization '04 Publisher: IEEE Computer Society.*

Vignette and exposure calibration and compensation Goldman, D.B.; Jiun-Hung Chen; Computer Vision, 2005. ICCV 2005. Tenth IEEE International Conference on vol. 1, Oct. 17-21, 2005 pp. 899-906 vol. 1 Digital Object Identifier 10.1109/ICCV.2005.249.*

Perez, P. et al., "Poisson Image Editing," *ACM Transactions on Graphics*, 22(3):313-318, Jul. 2003.

Agarwala, A. et al., "Interactive Digital Photomontage," *ACM Transactions on Graphics*, 23(3):294-302, Aug. 2004.

Georgiev, T., "Photoshop Healing Brush: a Tool for Seamless Cloning," In *Workshop on Applications of Computer Vision* (ECCV 02), 823-831.

Szeliski, R., et al., "Motion Estimation with Quadtree Splines," *IEEE Transactions on Pattern Analysis and Machine Intelligence*, 18(12):1199-1210: Dec. 1996.

Szeliski, R., "Locally Adapted Hierarchical Basis Preconditioning," *ACM Transactions on Graphics*, 25(3):1135-1143, Jul. 3, 2006.

International Search Report and Written Opinion mailed Jun. 5, 2008 from International Application No. PCT/US2007/087297.

Levin et al., "Seamless Image Stitching in the Gradient Domain," 2004, Computer Vision—ECCV 2004 Lecture Notes in Computer Science, pp. 377-389.

Agarwala, "Efficient Gradient-Domain Compositing Using Quadtrees," Jul. 2007, ACM Transactions on Graphics, Association for Computing Machinery, New York, NY, US, vol. 26, No. 3, pp. 1-5.

Xuexian et al., "High Performance Navigation and Rendering of Very-Large Scale Landscape and Seascape," Dec. 7, 2005, Computer Aided Design and Computer Graphics, Ninth International Conference on Computer Aided Design and Computer Graphics, IEEE, pp. 377-384.

Bao et al., "Panoramic Image Mosaics via Complex Wavelet Pyramid," Systems, Man and Cybernetics, 1998 IEEE International Conference, San Diego, CA, IEEE, vol. 5, Oct. 11, 1998, pp. 4614-4619.

Hafiz et al., "Hardware Design for Registration of Aerial Video Imagery," Multitopic Conference, Dec. 24, 2004. Proceedings of INMIC 2004. 8th International Lahore, Pakistan, IEEE, pp. 682-687.

Adelson et al., "Pyramid methods in image processing," Nov. 1984, RCA Engineer, Cherry Hill, NJ, US, vol. 29, No. 6, pp. 33-41.

Sadjadi, F., "Comparative Image Fusion Analysis," Computer Vision and Pattern Recognition, 2005, 8 pages.

International Preliminary Report on Patentability from International Application No. PCT/US2007/087297, mailed Jun. 16, 2009, 6 pages.

* cited by examiner

GRADIENT-DOMAIN COMPOSITING

BACKGROUND

This specification relates to composite image formation.

Image capture devices, such as cameras, can be used to capture an image of a section of a view, such as a section of a landscape. The section of the view whose image is captured by a camera is known as the field of view of the camera. Adjusting a lens associated with a camera may increase the field of view. However, there is a limit beyond which the field of view of the camera cannot be increased without compromising the quality or resolution of the captured image. It is sometimes necessary to capture an image of a view that is larger than what can be captured within the field of view of a camera. To do so, multiple overlapping images of segments of the view can be taken and then the images can be joined together (e.g., merged) to form a composite image.

One form of composite image is known as a panoramic image. A panoramic image provides a wider view of a scene than might be available using a camera lens and a single image. Another form of composite image is a mosaic which attaches many smaller images into one large image. The larger image will contain more pixels, and thus a higher resolution. This can allow much larger prints to be made of an image without a detrimental loss of resolution.

Additionally, multiple images of a single field of view can be captured by an image capture device, and these may be merged to remove unwanted articles within the image frame. For instance, a photo of a perfect Jamaican sunset moment can include a sailboat on the horizon, but just prior to that another image was captured where the sun was a bit higher, but without the sailboat upon the horizon. The image of the perfect sunset can be patched with section of the horizon from the prior image which doesn't include the sailboat to generate an image of the perfect sunset without a sailboat along the horizon.

To form a composite image, the relative positions of the component images representing adjacent sections of the view must be determined. In some systems, a first pair of component images is aligned. Additional component images are aligned with respect to the first pair of images. Images can be aligned for example, using camera properties, e.g., focal length, as well as image information, e.g., pixel data. One technique for aligning images is described in U.S. Pat. No. 7,103,236, which is incorporated by reference.

One technique for forming a composite image from aligned component images projects the images onto a circular cylinder, i.e., generates a "cylindrical projection". A focal length and rotation angles associated with each image can be used to map the image onto a cylinder. For example, the orientation of the camera can be represented as a set of rotation angles from a reference orientation. The cylindrically mapped component images have less distortion than images mapped directly onto a plane. The cylinder can be unwrapped to derive a planar composite image, e.g., to print the composite image. A description of using cylindrical projections to form a composite image is provided in U.S. Pat. No. 7,006,707, which is incorporated by reference.

The composite image is often further processed to blend the seams of the overlapping component images. For example, pixel values along the seams of the overlapping component images can be modified to provide a smooth transition between the images.

SUMMARY

Systems, methods, and apparatus, including computer program products, for forming composite images using gradient-domain compositing are provided. In general, in one aspect, a method is provided. The method includes receiving two or more source images and aligning the received source images to form an assembled composite image. The method also includes stitching the seams between the aligned source images in the assembled composite image to form a final composite image. The stitching includes performing a gradient domain compositing. The gradient domain compositing uses a subset of pixels in the assembled composite image including calculating individual pixel values along the seams and interpolating pixel values away from the seams.

Implementations of the method can include one or more of the following features. The stitching can further include using a quadtree data structure to represent the assembled composite image, where each high resolution leaf node in the quadtree represents a single pixel. Performing the gradient domain compositing can include solving a reduced system of equations defining pixel values using the quadtree. The quadtree can represent the seams of the assembled composite image using leaf nodes having a high resolution and where the quadtree includes regions of lower resolution representing smooth regions of the source images. The smooth regions can represent portions of the source images surrounded by pixels of the same source image such the pixel values within the smooth regions are interpolated when solving the quadtree. Stitching can include blending seams between the aligned source images to reduce artifacts in the final composite image.

In general, in one aspect, a computer program product is provided. The computer program product is encoded on a tangible program carrier and operable to cause data processing apparatus to perform operations. The operations include receiving two or more source images and aligning the received source images to form an assembled composite image. The operations also include stitching the seams between the aligned source images in the assembled composite image to form a final composite image. The stitching includes performing a gradient domain compositing. The gradient domain compositing uses a subset of pixels in the assembled composite image including calculating individual pixel values along the seams and interpolating pixel values away from the seams.

In general, in one aspect, a system is provided. The system includes a user interface device and one or more computers operable to interact with the user interface device. The one or more computers operable to receive two or more source images, align the received source images to form an assembled composite image, and stitch the seams between the aligned source images in the assembled composite image to form a final composite image, the stitching including performing a gradient domain compositing, the gradient domain compositing using a subset of pixels in the assembled composite image including calculating individual pixel values along the seams and interpolating pixel values away from the seams.

Implementations of the system can include one or more of the following features. The one or more computers can include a server operable to interact with the user interface device through a data communication network, and the user interface device is operable to interact with the server as a client. The user interface device can include a personal computer running a web browser or a mobile telephone running a wireless application protocol (WAP) browser. The one or more computers can include one personal computer, and the personal computer can include the user interface device.

Particular embodiments of the subject matter described in this specification can be implemented to realize one or more of the following advantages. The number of processed pixels can be reduced allowing a composite image to be stitched more efficiently. The number of processed pixels can be reduced without compromising the quality of the composite image.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
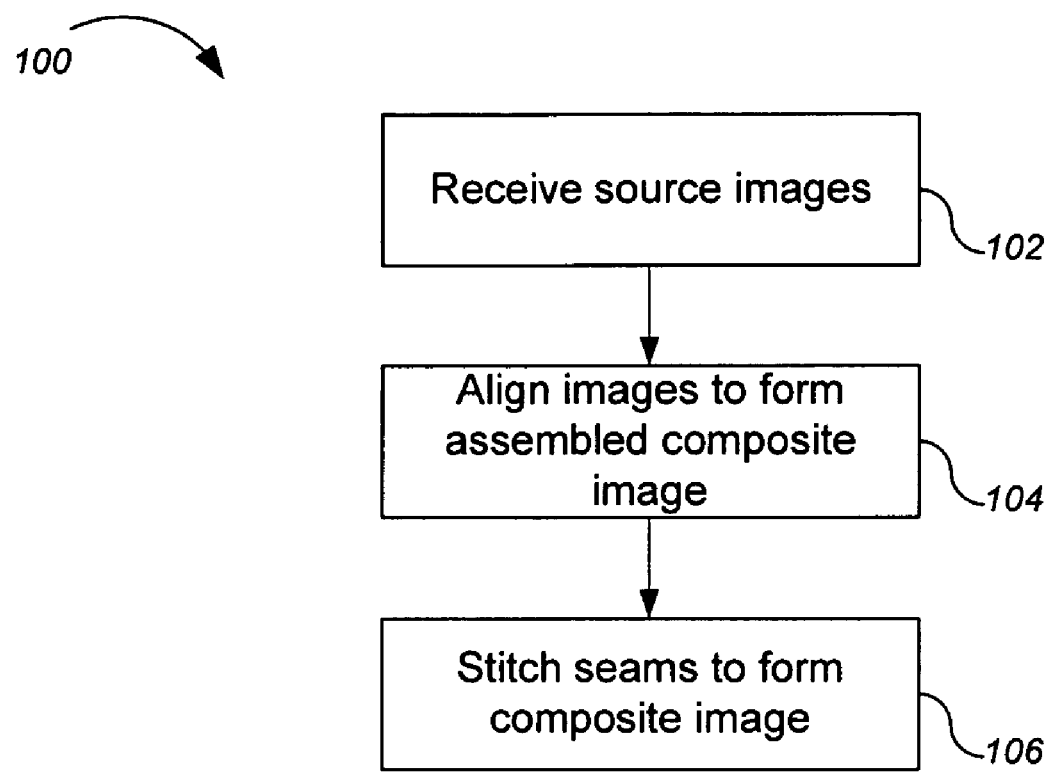
FIG. 1 illustrates an example process for generating a composite image.

FIG. 1 illustrates an example process 100 for generating a composite image. For convenience, the process will be described with reference to a computer system that performs the process. The system receives two or more source images (step 102). The two or more source images provide overlapping images of a field of a view or neighboring fields of a view.

The system aligns the received source images to form an assembled composite image (step 104). Typically, the assembly of a composite image from source images is not a simple process of laying out the images side-by-side. An image captured by a camera distorts the sizes of objects depicted in the image so that distant objects appear smaller than closer objects. The size distortion, which is known as perspective distortion, depends, for example, on the camera position and the pointing angle of the camera. Consequently, an object depicted in two different images can have a different size in each image. Also, different lighting effects, camera settings (e.g., focus, exposure rate, etc), and other variations in capture techniques can modify the tone, texture, intensity, or other properties of the images, even though the images capture the same view or a field of the same view.

The source images used in the composite image may not be perfectly aligned with each other spatially within the view. For example, a tripod device can be used to hold a camera at a set vertical height such that each field of a view captured in a source image has a consistent vertical height. However, if images are captured by a user holding the camera, the vertical height at each image capture may vary. The position of the field of the view depicted in a second image relative to the field of the view in a first image is determined to align images to form the composite image.

In some implementations, the user, for example through the use of a software tool or other process, aligns the source images. The system aligns the source images such that one or more objects or sections of objects which exist in both images overlap. For example, pixel values of images can be analyzed to find corresponding portions of respective component images in order to align the overlapping portions. Image resizing and/or other image manipulations may be required to facilitate alignment. The aligned source images have boundaries where the source images overlap.

The system stitches the boundaries, also referred to as seams, of the assembled composite image to form the final composite image (step 106). In some implementations, the source images are stitched together by copying pixel values from the source images into the composite image. In an alternative implementation, the system employs a gradient-domain compositing algorithm to stitch the source images together. The gradients between source pixels and their immediate neighbors can be used to blend the source images together to generate a composite image which appears to have been captured as a single image (e.g., a seamless panorama).

Figure 2:
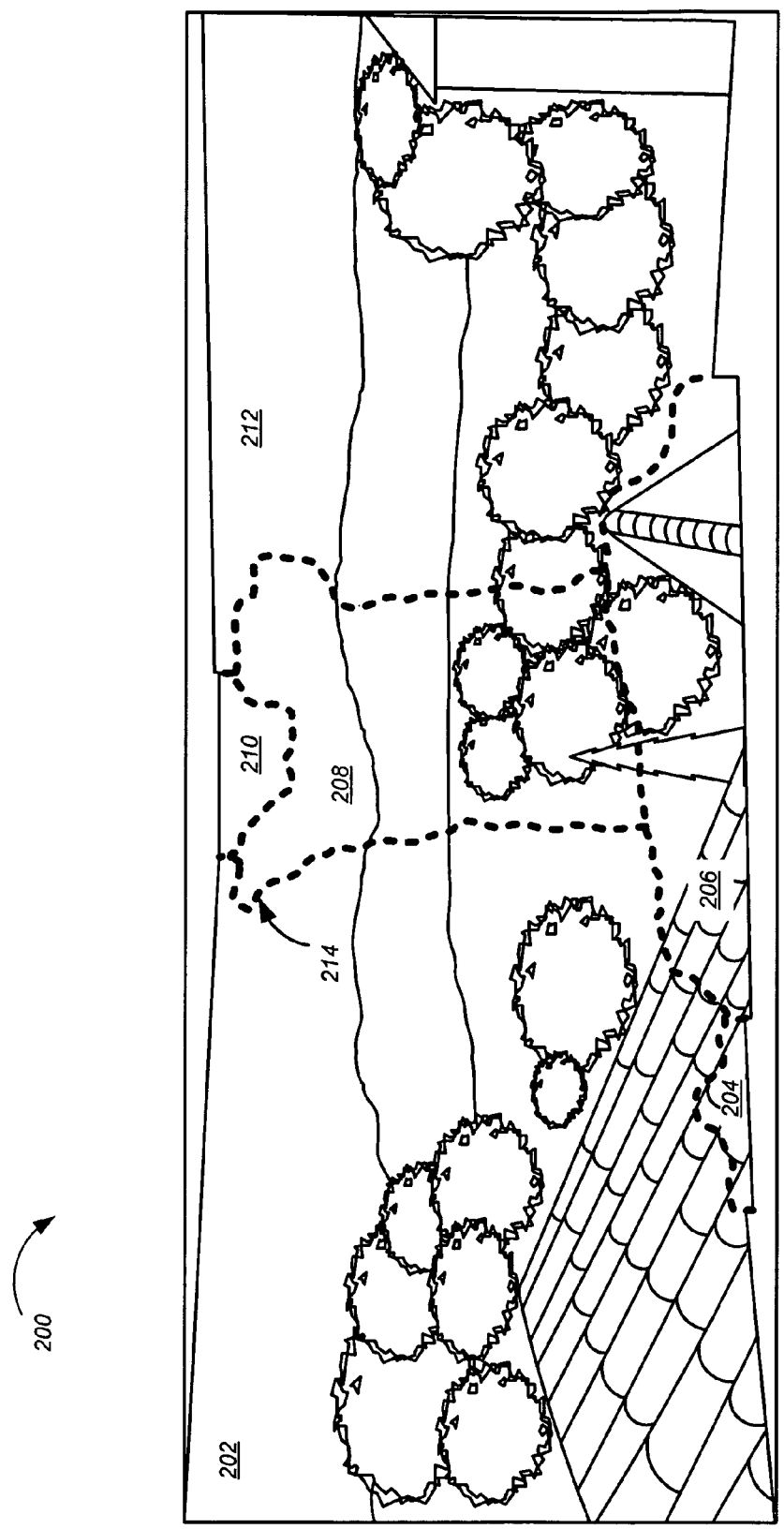
FIG. 2 illustrates a composite image generated from several source images.

FIG. 2 illustrates an assembled composite image 200 generated from several source images. The source images are aligned to form overlapping image segments 202, 204, 206, 208, 210, and 212. The assembled composite image 200 is formed from any number of source images, of which each can vary in size. The image segments 202-210 of each contributing source image do not necessarily form a straight line seam.

A dotted outline illustrates a border 214 between the image segments 202-212. The initial layout of the image segments 202-212 can be generated, for example, using a composite image assembling software. To form the final composite image from the assembled source image segments, the seams can be stitched together to smooth the image segments 202-212 at the border 214. For example, a gradient domain compositing algorithm can be applied to blend the seams of the image segments 202-212 to form a final stitched composite image. Gradient domain compositing is described in greater detail below.

Before the seams are stitched, an assembled composite image generally includes visible seams. This can be due, for example, to variations in the tone, size, and texture, found along the borders of the source image segments. These variations can occur, for example, due to geometric misalignment of the source image segments, differing scene illumination between the source image segments, variations in camera settings between image captures, or for other reasons.

Figure 3:
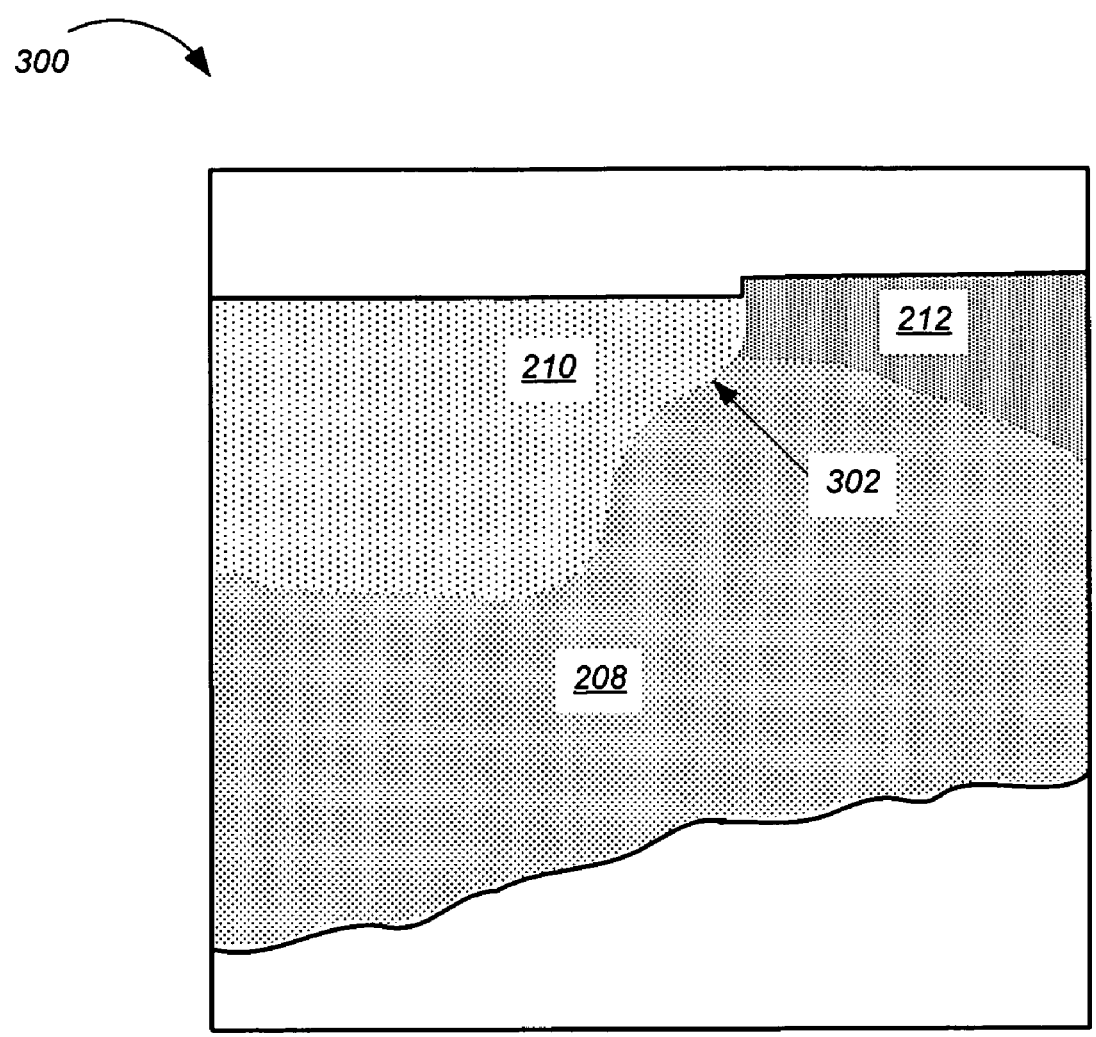
FIG. 3 illustrates an enlarged portion of the composite image shown in FIG. 2.

FIG. 3 illustrates an enlarged portion 300 of the assembled composite image 200 shown in FIG. 2. Artifacts are found where the image segments 208, 210, and 212 have been aligned without being stitched, for example by directly copying pixel values into the composite image from the source images. The artifacts are noticeable flaws within the composite image.

A seam 302 is visible between the image segment 210 and the image segments 208 and 212. As seen in FIG. 2, the portion of the composite image portrayed within the enlarged portion 300 is a region of the sky in the landscape view shown in assembled composite image 200. In one example, the artifact seam 302 may exist because the amount of sunlight along the horizon changed between the capture of image segment 210 and the capture of image segments 208 and 212. In another example, cloud drift may have generated the artifact. Further processing of the composite image can reduce or eliminate the artifacts.

Figure 4:
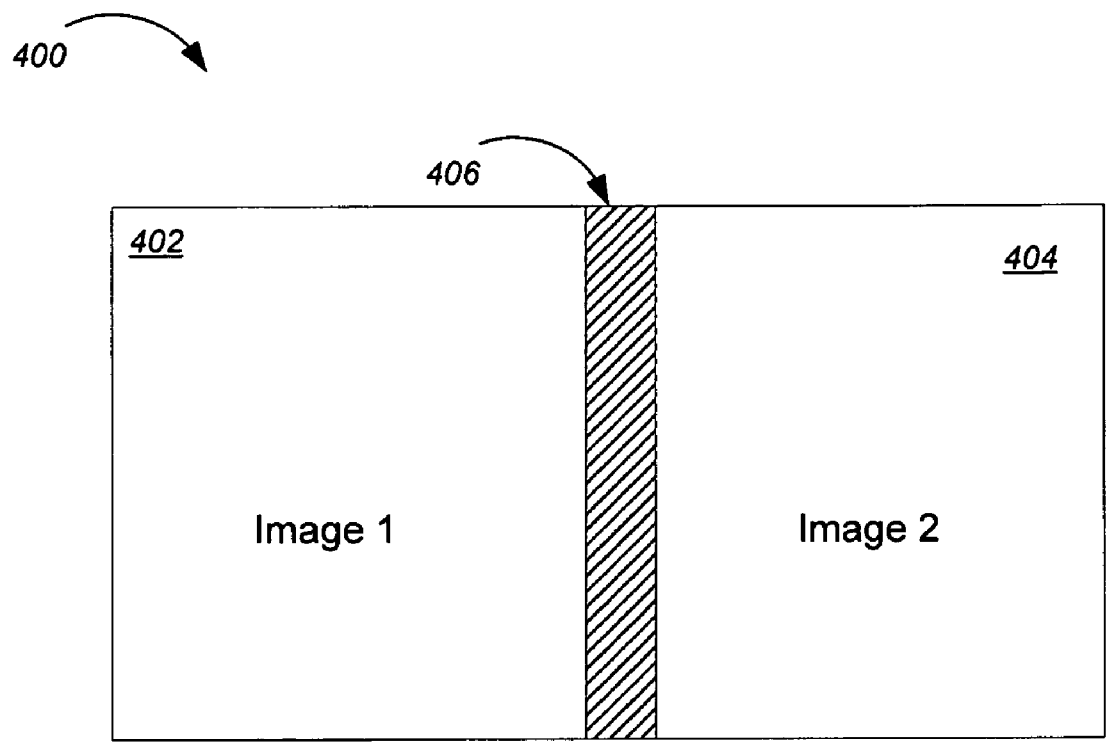
FIG. 4 is a block diagram illustrating an example of stitching two image segments.

FIG. 4 is a block diagram illustrating an example of stitching two image segments to form a composite image 400. A first image segment 402 is aligned with a second image segment 404 forming a seam 406. The seam 406 usually contains image features and/or colors which overlap from the first image segment 402 to the second image segment 404. Although the seam 406 is shown as a rectangular portion of the composite image 400, a seam 406 can be of any shape or size. The seam 406 provides an area of transition between image segments 402 and 404.

To generate a smooth transition along the area of the seam 406, gradient-domain compositing can be applied to the composite image 400. Gradient-domain compositing distributes variations in color, tone, intensity, texture, or other image parameters found along the seam throughout a larger segment of the image. This smoothes the differences between neighboring pixels along the seam edge, spreading out texture, color, and illumination discrepancies. Rather than perceiving a stark contrast from one source image to the next, gradient-domain compositing allows for a slow gradation of intensity. This allows a user to visually perceive the multiple image segments that have been stitched together as a single source image without visible seams and/or artifacts.

Generally, the first step in gradient domain compositing is to collect the gradients between source pixels and their immediate neighbors, pixel-by-pixel, into a vector field. For example, the gradient between two pixels contained with one region of a source image can be stored within the vector field. Additionally, the average of the gradients between pixels that lie along the boundary between two regions of two source images can be calculated and stored. Other methods of gradient calculation are possible. Each horizontal and vertical gradient can be expressed in matrix form as $Ax=b$, where $A$ is a system of equations describing the pixel gradients and $x$ is a vector whose lengths is the number of pixels. The solution $x$ that minimizes $Ax=b$ in a least squares calculation is the solution to the equation $A^TAx=A^Tb$, where $A^T$ is the transpose of $A$.

A linear system (e.g. as defined by the above equation) can be applied to the vector field to solve for the final composite image in which the gradients best match the vector field, for example, according to a least squares calculation. The linear system is applied on a pixel-by-pixel basis, with the composite image being rendered based upon variables describing the color of each pixel. In one example, the gradient value associated with each pixel within the composite image is added to an initial pixel color value to generate a modified pixel color value for that pixel. The initial pixel color value, for example, is obtained by simply copying pixel color values from source images.

Determining the gradients of every pixel comprising the composite image can quickly become unwieldy in terms of memory usage and computational requirements when the composite image includes several megapixels. To reduce the computational load, the number of individual pixels that are calculated can be reduced. In particular, the individual gradients along the boundary edges and the seams, e.g., the seam 406, of the images involved in the composition (e.g., image segments 402 and 404) can be calculated, while the pixel values contained within the interior of the image segments 402 and 406 can be interpolated. In some implementations, using the basic concept of gradient domain compositing, the complexity of the linear system is reduced by representing the composite image as a quadtree.

A quadtree is a hierarchical data structure which can be used to subdivide regions of the composite image. A quadtree is made up of nodes. Each quadtree node stores the location of a smooth or non-smooth region of an assembled composite image. Smooth regions are generally interior regions of image segments and are described in greater detail below. Using the quadtree as a guide, the gradient calculations are greatly reduced by limiting the number of gradient calculations for individual pixels. Pixels in smooth regions can be interpolated according to the quadtree, reducing the number of individual pixel calculations. In some implementations, the number of variables within the linear system, rather than being equal to the number of pixels, n, is reduced to $O(\sqrt{n})$, O being an estimation of the function's behavior when n is very large. Once the gradients have been calculated along the seam regions, the gradient offsets may be applied both to each pixel along the seam as well as to each smooth region (e.g., using interpolation) of the quadtree to calculate new pixel values throughout the entire composite image. The stitched source images, at the end of the linear system calculations, generate a new composite image. The composite image smoothly blends features from each of the image segments involved in the gradient-domain composite image calculations.

Figure 5:
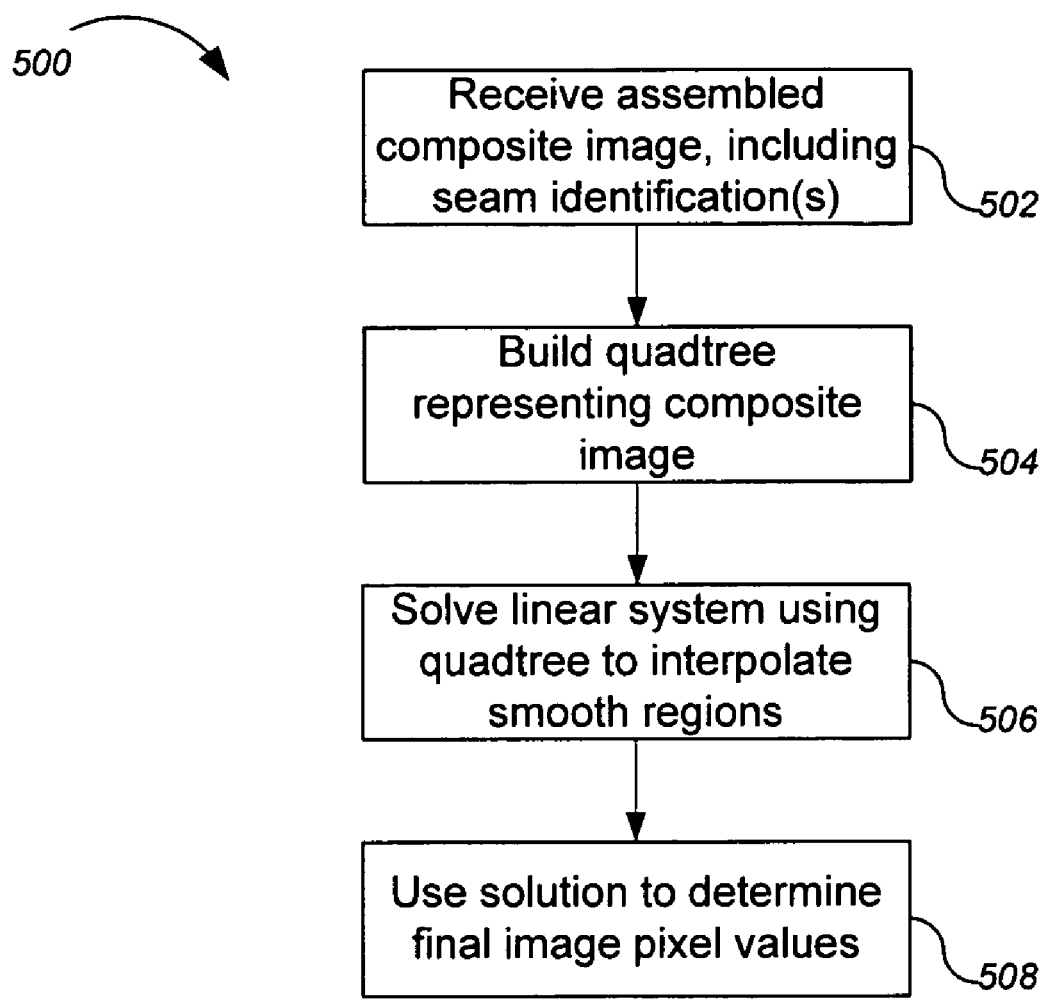
FIG. 5 illustrates an example process for performing gradient domain compositing using quadtrees.

FIG. 5 illustrates an example process 500 for stitching a composite image together using gradient-domain compositing using quadtrees. The system receives an assembled composite image, including the identification of the boundaries between the image segments (step 502). For example, the system can receive information regarding the assembled composite image 200 (FIG. 2). Taking into consideration that each pixel value x within the final composite image will be the sum of the initial value $x_0$ of each pixel within the assembled composite image plus a gradient offset value $x_\delta$, the pixel value x may be substituted for the equation $$x=x_\delta+x_0.$$

Also, using a reduced space equation to provide gradient-domain compositing of the image, Sy may be substituted for x within the gradient domain matrix equation above, y being a vector of size m such that m<<n. This substitution leads to the equation:

$$ASy=b.$$

Applying the above substitutions, $A^TAx=A^Tb$, can now be rewritten as:

$$S^TA^TAy_\delta=S^TA^T(b-ASy_0).$$

Before applying this equation to the assembled composite image, the system builds a quadtree representation of the smooth and non-smooth regions of the assembled composite image (step 504).

Figure 6:
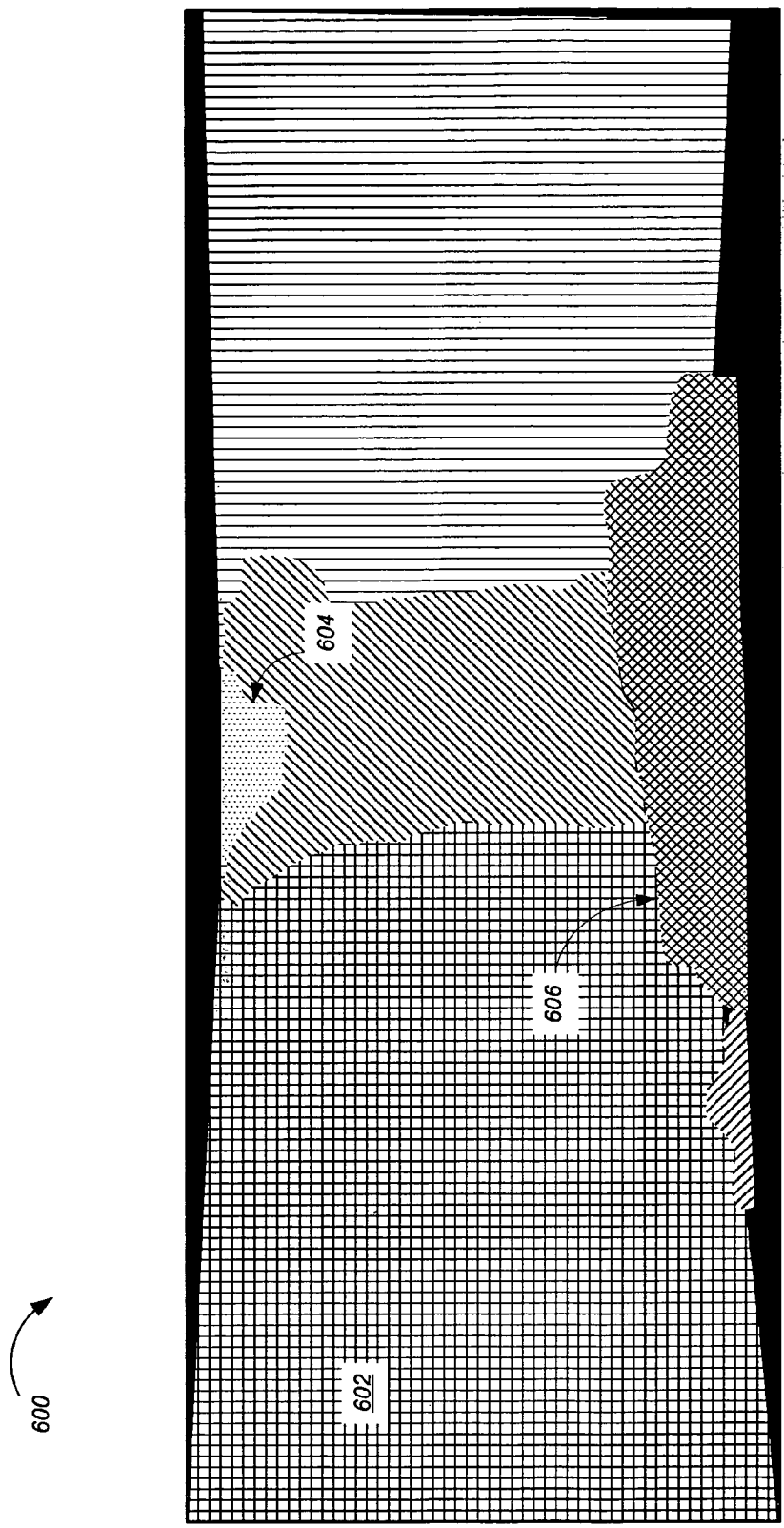
FIG. 6 illustrates smooth regions of a composite image.

FIG. 6 illustrates smooth images of a composite image 600. The smooth regions, e.g., smooth region 602, can exist between seams, such as seams 604 and 606, representing seams where aligned image segments meet. Smooth regions are areas that do not require individual gradient calculations to heal seams or artifacts, because the surrounding neighbor pixels belong to the same image segment. In contrast, the seams between image segments are generally not smooth. The smooth regions of the composite image, for example, may only require minor tone or intensity alterations to better match the other source images contributing to the composite image. Mathematically, within the smooth regions of the assembled composite image, the gradient domain compositing algorithm reduces to $$S^T A^T A y_\delta = 0$$

The corners of the quadtree nodes store indexes to specific elements in the vector $y_\delta$. The resolution of the quadtree decreases from the boundary edge (high resolution) to the inside of the source image (e.g., the smooth regions) (low resolution). The root node of the quadtree is generated using the smallest square that can entirely contain the image domain having a width of a power of two. Each quadtree node has four children which divide the space into four quadrants. The smallest quadtree nodes, those bordering the seams of the assembled composite image, are leaf nodes. The leaf nodes represent single pixels. Each leaf node in the quadtree contains color information regarding that pixel location. The color information can be used to calculate gradients. The smooth regions, which have gradient offsets applied but not calculated, do not require stored pixel color information.

In some implementations of the quadtree, no two nodes sharing an edge can differ in tree depth by more than one. This means that the neighboring nodes are sized to be equal, half, or double each other.

Figure 7:
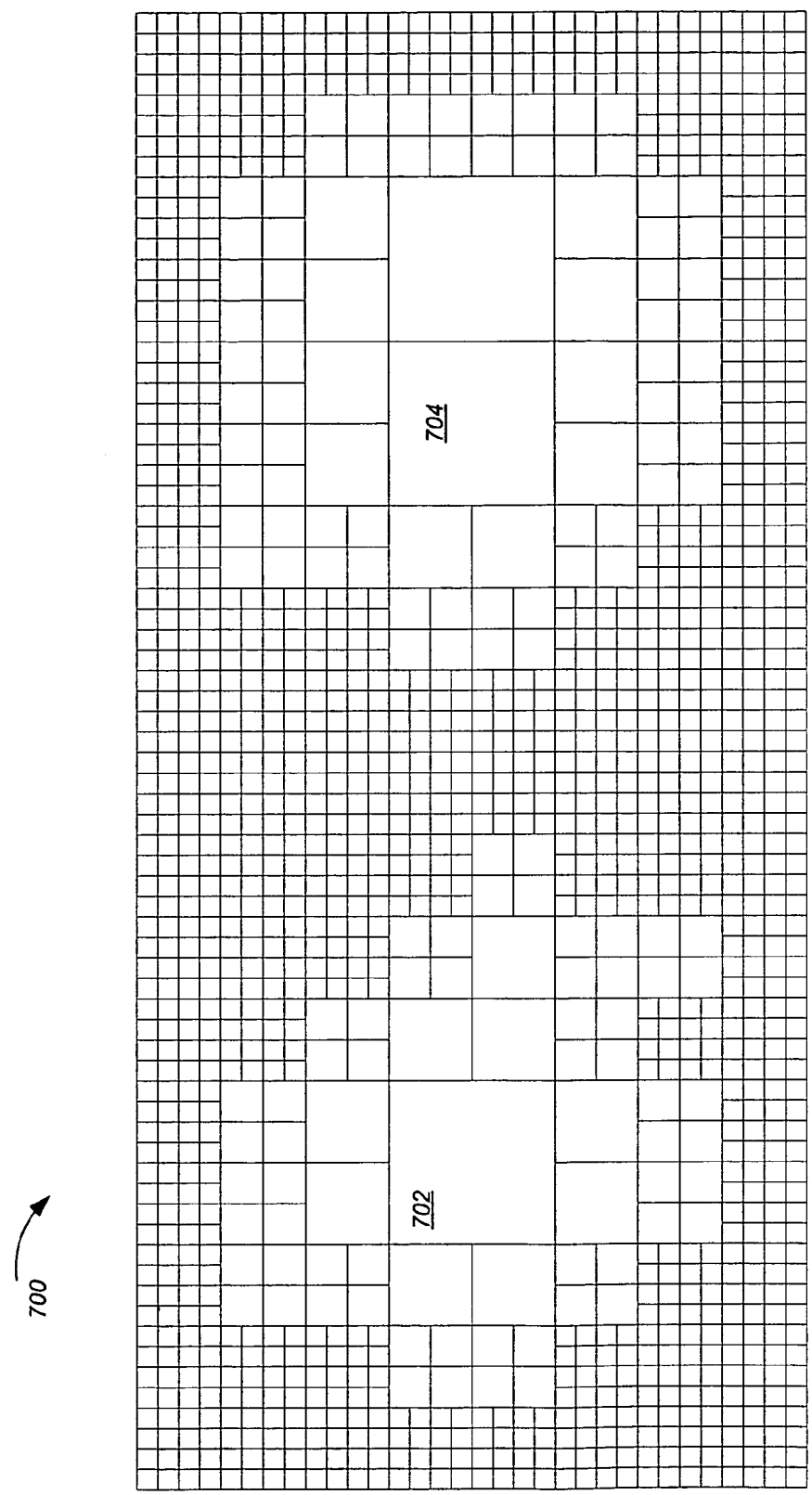
FIG. 7 illustrates an example block representation of an image quadtree.

FIG. 7 illustrates a block representation of a quadtree 700. The quadtree 700 includes unit-sized boxes at the edges of each image segment 702 and 704 as well as at a seam 706 between the two image segments. The resolution diminishes towards the interior of each image segment 702 and 704 contributing to the composite image represented by larger sized boxes in the quadtree 700. Each block, representing a node of the quadtree, is half, double, or the same size as each neighboring block. Limiting the quadtree representation in this manner provides a smooth transition between the seams and the interior of the source images when rendering the composite image.

As shown in FIG. 5, once the quadtree has been built, the system solves the linear system for gradient domain compositing, using the quadtree to interpolate the smooth regions (step 506). Along the seams, iterating through the pixel-sized leaf nodes, the system calculates the vector $S^T A^T(b - A S y_0)$. This vector can be used to solve for $y_\delta$ using the initial pixel color values $y_0$ stored within the pixel-sized leaf nodes. Once the vector has been populated, the system solves for $y_\delta$ using the equation $$S^T A^T A y_\delta = S^T A^T (b - A S y_0)$$

The system uses this solution to generate the final composite image (step 508). The system solves for $x_\delta$ by multiplying that matrix S by the vector $y_\delta$. Adding $x_\delta$, the gradient offset solved for above, to $x_0$, the initial pixel value, the system iterates through each pixel within the assembled composite image. These sums provide the final pixel values for the composite image.

Figure 8:
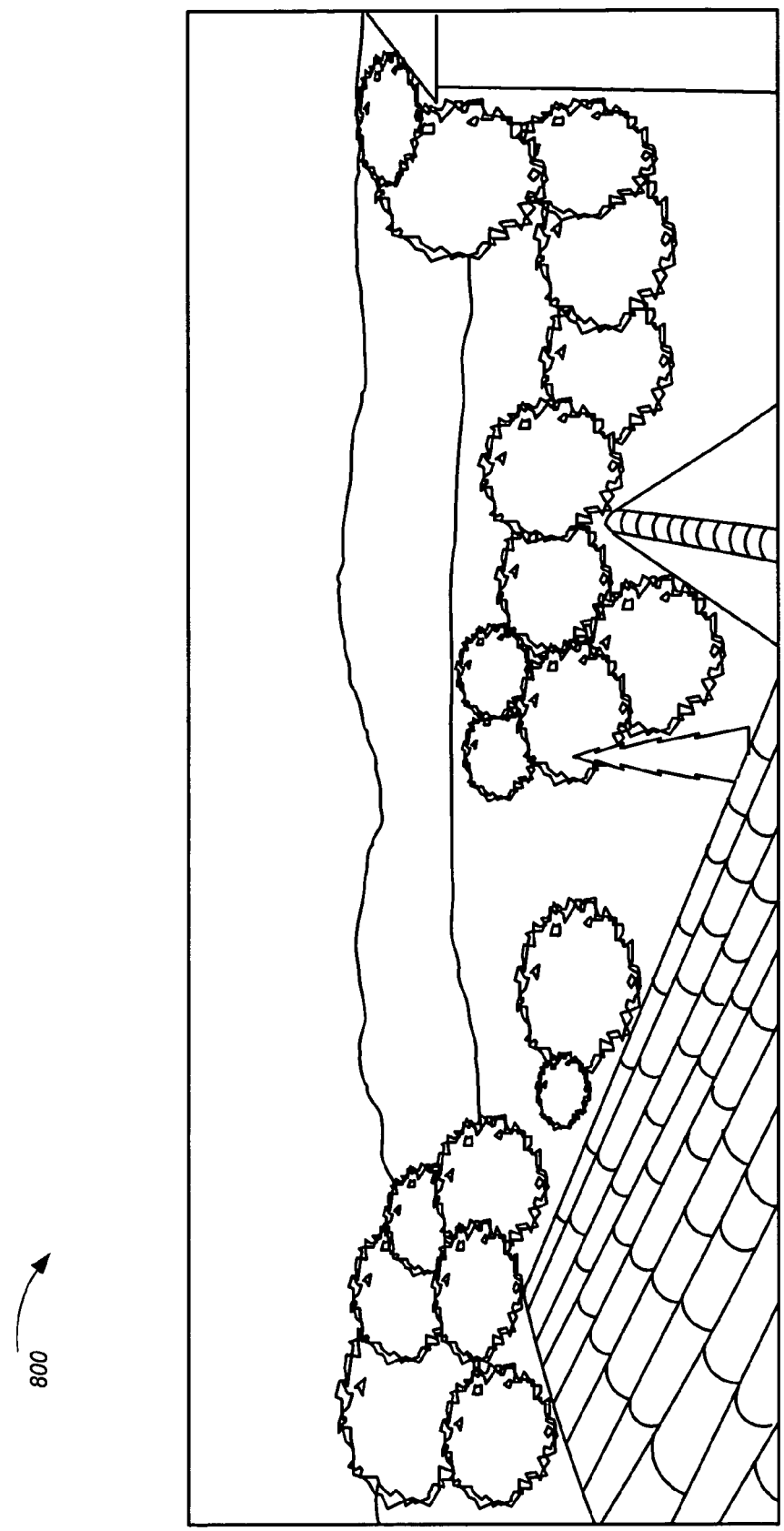
FIG. 8 illustrates a final composite image after stitching.

FIG. 8 illustrates a final composite image 800 after stitching. The composite image 800 is generated by applying gradient compositing with quadtree interpolation to the assembled composite image 200 (FIG. 2). The final composite image 800 has been stitched such that there are no visible seams or artifacts between image segments used to generate the composite image.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   obtaining two or more source images;
   aligning the received source images to form an assembled composite image; and
   stitching, by a computer, the seams between the aligned source images in the assembled composite image to form a final composite image, the stitching including performing a gradient domain compositing, the gradient domain compositing using a subset of pixels in the assembled composite image including calculating individual pixel values along the seams and interpolating pixel values away from the seams, and wherein the assembled composite image is represented by a quadtree;
   Where the quadtree represents the seams of the assembled composite image using leaf nodes having a high resolution and where the quadtree includes regions of lower resolution representing smooth regions of the source images; and
   where performing the gradient domain compositing includes solving a reduced system of equations defining pixel values using the quadtree.

2. The method of claim 1, where each high resolution leaf node in the quadtree represents a single pixel.

3. The method of claim 1, where stitching includes blending seams between the aligned source images to reduce artifacts in the final composite image.

4. A computer-implemented method, comprising:
   obtaining two or more source images;
   aligning the received source images to form an assembled composite image; and
   stitching, by a computer, the seams between the aligned source images in the assembled composite image to form a final composite image, the stitching including performing a gradient domain compositing, the gradient domain compositing using a subset of pixels in the assembled composite image including calculating individual pixel values along the seams and interpolating pixel values away from the seams, and wherein the assembled composite image is represented by a quadtree;
   where the quadtree represents the seams of the assembled composite image using leaf nodes having a high resolution and where the quadtree includes regions of lower resolution representing smooth regions of the source images; and
   where the smooth regions represent portions of the source images surrounded by pixels of the same source image such the pixel values within the smooth regions are interpolated when solving the quadtree.

5. The method of claim 4, where each high resolution leaf node in the quadtree represents a single pixel.

6. The method of claim 4, where stitching includes blending seams between the aligned source images to reduce artifacts in the final composite image.

7. A computer program product, encoded on a machine-readable storage device, operable to cause data processing apparatus to perform operations comprising:

obtaining two or more source images;

aligning the received source images to form an assembled composite image; and stitching the seams between the aligned source images in the assembled composite image to form a final composite image, the stitching including performing a gradient domain compositing, the gradient domain compositing using a subset of pixels in the assembled composite image including calculating individual pixel values along the seams and interpolating pixel values away from the seams, and wherein the assembled composite image is represented by a quadtree;

Where the quadtree represents the seams of the assembled composite image using leaf nodes having a high resolution and where the quadtree includes regions of lower resolution representing smooth regions of the source images; and where performing the gradient domain compositing includes solving a reduced system of equations defining pixel values using the quadtree.

8. The computer program product of claim 7, where each leaf nodes in the quadtree represents a single pixel.

9. The computer program product of claim 7, where stitching includes blending seams between the aligned source images to reduce artifacts in the final composite image.

10. A computer program product, encoded on a machine-readable storage device, operable to cause data processing apparatus to perform operations comprising:

obtaining two or more source images;

aligning the received source images to form an assembled composite image; and stitching the seams between the aligned source images in the assembled composite image to form a final composite image, the stitching including performing a gradient domain compositing, the gradient domain compositing using a subset of pixels in the assembled composite image including calculating individual pixel values along the seams and interpolating pixel values away from the seams, and wherein the assembled composite image is represented by a quadtree;

where the quadtree represents the seams of the assembled composite image using leaf nodes having a high resolution and where the quadtree includes regions of lower resolution representing smooth regions of the source images; and where the smooth regions represent portions of the source images surrounded by pixels of the same source image such the pixel values within the smooth regions are interpolated when solving the quadtree.

11. The program product of claim 10, where each high resolution leaf node in the quadtree represents a single pixel.

12. The program product of claim 10, where stitching includes blending seams between the aligned source images to reduce artifacts in the final composite image.

13. A system comprising:

a user interface device; and one or more computers operable to interact with the user interface device and to:

obtain two or more source images;

align the received source images to form an assembled composite image; and stitch the seams between the aligned source images in the assembled composite image to form a final composite image, the stitching including performing a gradient domain compositing, the gradient domain compositing using a subset of pixels in the assembled composite image including calculating individual pixel values along the seams and interpolating pixel values away from the seams, and wherein the assembled composite image is represented by a quadtree;

Where the quadtree represents the seams of the assembled composite image using leaf nodes having a high resolution and where the quadtree includes regions of lower resolution representing smooth regions of the source images; and where performing the gradient domain compositing includes solving a reduced system of equations defining pixel values using the quadtree.

14. The system of claim 13, wherein the one or more computers comprise a server operable to interact with the user interface device through a data communication network, and the user interface device is operable to interact with the server as a client.

15. The system of claim 14, wherein the user interface device comprises a personal computer running a web browser or a mobile telephone running a WAP browser.

16. The system of claim 13, wherein the one or more computers comprises one personal computer, and the personal computer comprises the user interface device.

17. The system of claim 13, where each high resolution leaf node in the quadtree represents a single pixel.

18. The system of claim 13, where stitching includes blending seams between the aligned source images to reduce artifacts in the final composite image.

19. A system comprising:

a user interface device; and one or more computers operable to interact with the user interface device and to:

obtain two or more source images;

align the received source images to form an assembled composite image; and stitch the seams between the aligned source images in the assembled composite image to form a final composite image, the stitching including performing a gradient domain compositing, the gradient domain compositing using a subset of pixels in the assembled composite image including calculating individual pixel values along the seams and interpolating pixel values away from the seams, and wherein the assembled composite image is represented by a quadtree;

where the quadtree represents the seams of the assembled composite image using leaf nodes having a high resolution and where the quadtree includes regions of lower resolution representing smooth regions of the source images; and where the smooth regions represent portions of the source images surrounded by pixels of the same source image such the pixel values within the smooth regions are interpolated when solving the quadtree.

20. The system of claim 19, where each high resolution leaf node in the quadtree represents a single pixel.

21. The system of claim 19, where stitching includes blending seams between the aligned source images to reduce artifacts in the final composite image.

22. The system of claim 19, wherein the one or more computers comprise a server operable to interact with the user interface device through a data communication network, and the user interface device is operable to interact with the server as a client.

23. The system of claim 22, wherein the user interface device comprises a personal computer running a web browser or a mobile telephone running a WAP browser.

24. The system of claim 19, wherein the one or more computers comprises one personal computer, and the personal computer comprises the user interface device.

* * * * *